United States Patent
Kurosawa et al.

Patent Number: 6,043,583
Date of Patent: Mar. 28, 2000

[54] MOTOR STRUCTURE

[75] Inventors: Souichi Kurosawa; Atsunori Matsuda, both of Miyota-machi, Japan

[73] Assignee: Minebea Co., Ltd, Nagano-ken, Japan

[21] Appl. No.: 09/148,329

[22] Filed: Sep. 4, 1998

[30] Foreign Application Priority Data

Sep. 8, 1997 [JP] Japan ................................ 9-243099

[51] Int. Cl.⁷ .................................................. H02K 1/12
[52] U.S. Cl. .......................... 310/254; 310/258; 310/259; 310/216; 310/217; 310/43
[58] Field of Search .................................. 310/254, 259, 310/256, 43, 42, 216, 217, 258, 45, 67 R; 29/596

[56] References Cited

U.S. PATENT DOCUMENTS

| | | | |
|---|---|---|---|
| 3,646,374 | 2/1972 | Jordan et al. | 310/45 |
| 3,922,575 | 11/1975 | Sauer | 310/214 |
| 4,085,347 | 4/1978 | Lichius | 310/259 |
| 4,103,195 | 7/1978 | Torossian et al. | 310/259 |
| 4,387,936 | 6/1983 | Ishizawa | 310/90.5 |
| 5,134,327 | 7/1992 | Sumi et al. | 310/43 |
| 5,142,179 | 8/1992 | Nakamura et al. | 310/217 |
| 5,191,698 | 3/1993 | Sumi et al. | 29/596 |

*Primary Examiner*—Nestor Ramirez
*Assistant Examiner*—Saeed Ghahramani
*Attorney, Agent, or Firm*—Staas & Halsey LLP

[57] ABSTRACT

A motor structure having a laminated stack made of soft magnetic plates, a plurality of laminated constituting stator magnetic pole portions and a yoke portion, between each plate is an insulative bonding material, so that the plates are insulated from, and kept in tight contact with, each other. A synthetic resin layer surrounds and tightly binds the lamination stack.

5 Claims, 3 Drawing Sheets

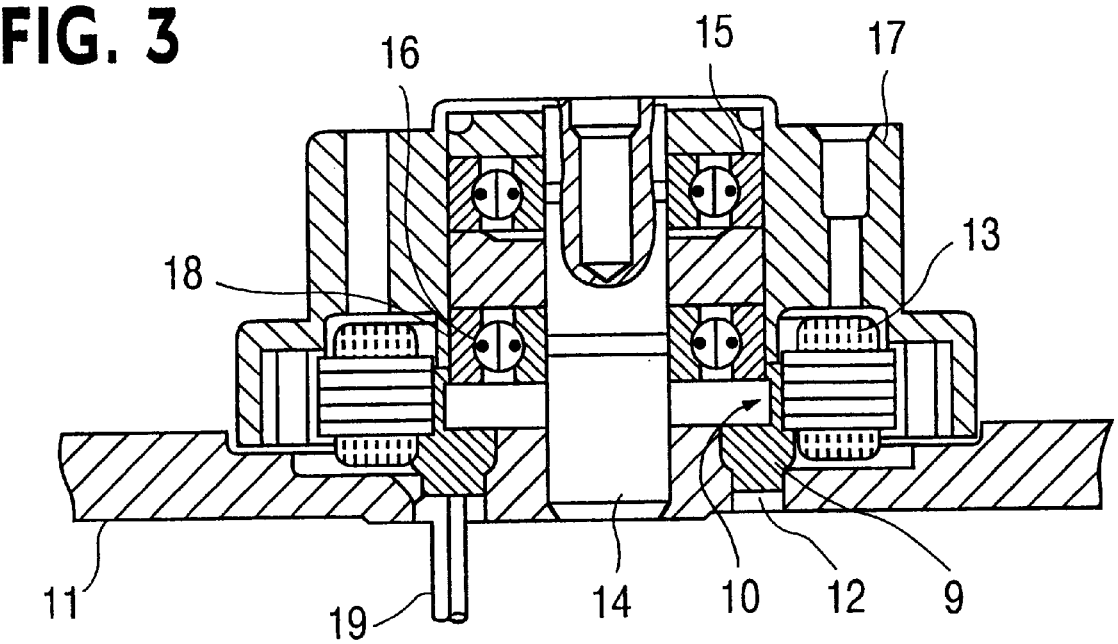
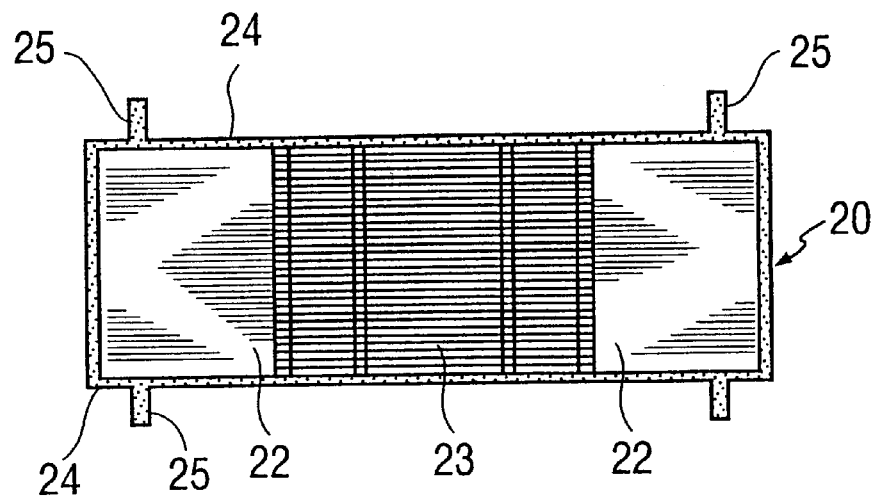

MOTOR STRUCTURE

BACKGROUND OF THE INVENTION

1. Field of the Invention

The present invention relates to a structure of a motor and more particularly to a structure of a synchronous motor and a stepping motor of small size.

2. Description of the Prior Art

Small-sized synchronous motors and stepping motors are being used as drive sources of various electronic apparatuses such as the drive source of a floppy disk drive as an item of peripheral equipment of a personal computer. Of such motors, there is an inner rotor type, in which a cylindrical rotor constructed of magnetic poles of a permanent magnet is disposed for rotation and stator magnetic poles, which generate a revolving magnetic field to provide the rotor with a driving force, are disposed around the rotor in confronting relationship. The stator magnetic poles are fixed onto a substrate constructed of an insulated metal plate and the rotor is borne by two bearings respectively fixed to the substrate and the stator magnetic poles. Further, there are disposed such parts as electronic circuits for driving the motor and a position detecting coil for detecting the position of the rotor fixed onto the substrate.

There is also a motor of an outer rotor type, in which a plurality of magnetic poles is radially projected from a yoke member in a circular ring form, stator coils are wound around the magnetic poles, and the thus formed stator magnetic poles are fixed onto a substrate, and on the other hand, a rotating plate of a shallow dish-form is disposed around the stator magnetic poles for rotation around the same with permanent magnets disposed on the inside of the circumferential portion of the rotating plate arranged in confronting relationship with front ends of the magnetic poles constituting the stator.

In the assembly work of either of the motor type, such an intermediate product is used for the stator magnetic poles that is formed by laminating a plurality of sheet members punched from a soft iron plate and having the laminated sheet members put together by spot welding, caulking, or by passing a bar through the laminations and then caulking both ends of the through bar. Such an intermediate product is called a lamination stack.

For the small-sized synchronized motor or stepping motor in which the rotor rotates with a minute gap between it and the stator magnetic poles, the machining accuracy of the component parts has great importance for good performance. Especially, occurrence of noise of the motor is greatly dependent on accuracy of the lamination stack.

In order to manufacture them at low cost or improve the manufacturing efficiency, conventional lamination stacks have been manufactured by caulking "V" or "O" shaped caulked portions provided in each lamination (sheet member), in a stator iron core of a predetermined thickness within a press metallic mold. However, it is difficult to maintain the inner diameter of the lamination and the caulked portion coaxial, which is important for the accuracy of the motor, and it has been unavoidable that "deviation in lamination" occurs in the inner diameter of the stator iron core joined by caulking. Also, due to bulging of the base portion of the "V" caulking, a small gap is produced between laminations to deteriorate the tight contact between them and, hence, it has been impossible to increase the magnetic flux density and, accordingly, to increase the torque.

It is also possible to obtain a lamination stack by laminating sheet members, each of which has been punched out with high precision and bonding them on top of each other. However, since there is a problem with the bonding strength of the bonding agent, it has been impossible to obtain a durable lamination stack providing a good performance of the motor. In the case of an HB type stepping motor, it is practiced to place two robust covers made of cast iron at the top and the bottom sides of the lamination stack and allow the covers to strongly press the lamination stack from the top and the bottom sides by such means as fastening of screws so that the lamination stack will not cause deviation in lamination with time or the lamination stack will not cause displacement or deviation in lamination only by being subjected to a certain amount of vibration or impulse. However, since the covers are made of a soft magnetic material and have a large volume, and, accordingly, have low magnetic reluctance, there is such a disadvantage that the covers allow a lot of leakage fluxes from the stator magnetic poles to pass through the cover.

The present invention was made to overcome the above mentioned difficulties included in the related art. Accordingly, it is an object of the invention to provide a lamination stack keeping the laminated sheets in good contact with each other, maintaining the accuracy of the lamination stack over a long time of service, and being durable.

SUMMARY OF THE INVENTION

In order to achieve the above mentioned object, the invention provides, in a motor structure using a laminated block of soft magnetic plates formed by laminating a plurality of sheet members to form as the stator magnetic poles and the yoke, a motor structure including a lamination stack maintaining the plurality of sheet members in such a state that they are insulated from each other and kept in tight contact with each other and a synthetic resin layer surrounding the laminated block.

Further, the plurality of sheet members is bonded on surfaces of each other by a bonding agent while being insulated from each other.

The motor may be either a motor of an outer rotor type or a motor of an inner rotor type.

Further, the case enclosing the motor is formed by a pressed metallic plate and it can be made of a non-magnetic metallic plate.

BRIEF DESCRIPTION OF THE DRAWINGS

FIG. 3 is a sectional view of a structure of a motor of an outer-rotor type to which a lamination stack according to the invention is applied.

FIG. 4 is a vertical sectional view showing a lamination stack according to a second embodiment of a motor structure according to the invention.

DESCRIPTION OF THE PREFERRED EMBODIMENTS

An embodiment of the present invention will be described in detail with reference to the accompanying drawings. FIG.

Figure 1:
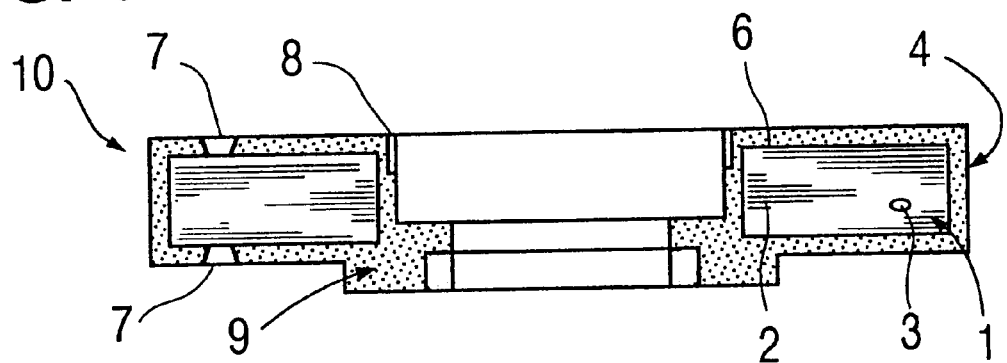
FIG. 1 is a vertical sectional view of a lamination stack of a motor structure according to the invention.
Figure 2:
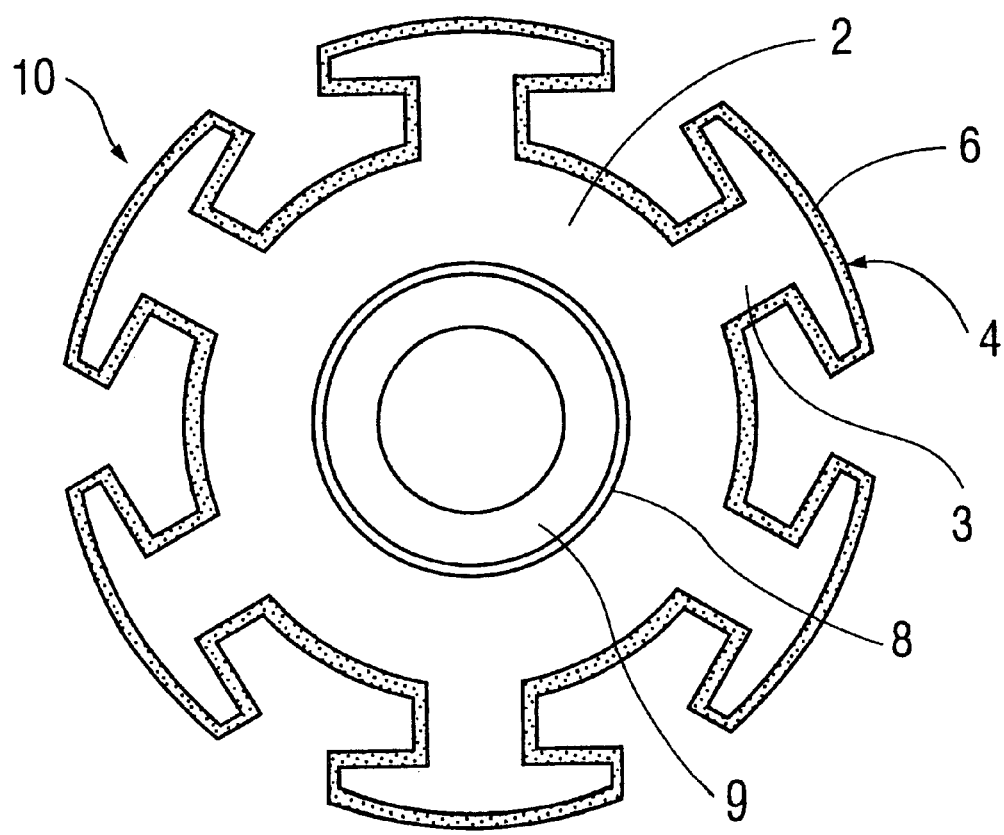
FIG. 2 is a transverse sectional view of a lamination stack of a motor structure according to the invention.

1 is a vertical sectional view of a lamination stack according to the invention and FIG. 2 is a transverse sectional view of the same. Referring to the drawings, reference numeral 1 denotes a lamination, or a sheet member, made of a soft magnetic plate the same as before, as a constituent of the stator magnetic poles. The sheet member 1 has a yoke portion 2 in a circular ring form, a stator magnetic pole portion 3, a plurality of which portions is radially and outwardly projecting from the yoke portion, and stator magnetic pole teeth 4 provided on the front ends of the stator magnetic pole portions. A plurality of the sheet members 1 are laminated and these sheet members 1 is bonded on top of each other with a bonding agent.

The process of laminated bonding of the sheet members 1 will now be described. First, each sheet member 1 is punched out by a press. Then, a bonding agent made of an insulating material such as epoxy resin is thinly applied onto both faces of the sheet member 1 and the applied bonding agent is dried. A needed number of such sheet members 1 applied with the bonding material is laminated within a metallic mold and they are heated under pressure, so that the bonding agent is melted, bubbles between the sheet members 1 are pressed out, and the sheet members 1 are brought sufficiently close to each other, and thereafter they are cooled down. Thus, they are bonded together while being electrically insulated from each other. In this state, the plurality of the sheet members 1 is laminated and there are produced no gaps between adjoining sheet members.

Since, in the above described process, the sheet members 1 are allowed to bond with each other within the metallic mold formed with sufficient precision, the sheet members 1 forming the lamination block are laminated and bonded together with satisfactory precision in each detail. However, since the laminated sheet members 1 are bonded with each other only by the bonding agent, they are weak against an external force. Therefore, in the present invention, a synthetic resin material is molded around the block formed of the laminated sheet members 1 to thereby hold the sheet members 1 in tight contact with each other and prevent the lamination stack from getting out of shape over a long time of service.

To form such a lamination stack, another metallic mold is prepared. On the interior of the metallic mold, there are previously provided protrusions for pressing the stator magnetic pole teeth 4 and the yoke portions 2 from the top and the bottom faces. After mounting the lamination stack in the metallic mold, a synthetic resin is poured into the metallic mold such that there is formed a synthetic resin layer on the inner periphery of the metallic mold. By the molding, a thin synthetic resin layer 6 is formed on the surfaces of the yoke portions 2, stator magnetic pole portions 3, and the stator magnetic pole teeth 4. Further, in the prepared metallic mold, there are provided spaces for accommodating such parts as shaft bearings that are fixed in places. Thus, on the stator magnetic pole assembly gone through the molding process, there are additionally formed extruded portions serving for both retaining and positioning the motor parts. In the present embodiment, there are formed, as shown in FIG. 2, a circular groove 8 in which the later described hub of the rotor is loosely fitted and a protruded portion 9 for positioning the lamination stack 10 in the substrate.

Further, in the molding process in the present invention, since the synthetic resin is poured into the metallic mold while the stator magnetic pole teeth 4 and the yoke portions 2 are pressed by the protrusions from the top and the bottom faces, the sheet members taken out of the metallic mold are in tight contact with each other. However, at the portions pressed by the protrusions on the interior of the metallic mold, there are formed exposed portions 7 which are not covered by the synthetic resin. There are also formed such exposed portions 7 on the portions held in contact with the inner wall of the metallic mold. These exposed portions are filled up with an insulator by such, e.g., electrodeposition painting.

FIG. 3 is a sectional view of a motor structure using a lamination stack to which the invention is applied. The motor is assembled by fitting protrusions 9 projecting from the bottom of the lamination stack 10 having stator coils 13 fixed thereon into positioning holes 12 made in the substrate 11 and fixing the lamination stack 10 having the stator coils 13 fixed thereon onto the substrate 11 by using a fixing means not shown and, then, fitting bearings 15 and 16 over a bearing shaft 14 erected in the substrate 11 and fitting the rotor 17 over the outer rings of the bearings 15 and 16. In this motor, the hub 18 for retaining the bearings of the rotor 17 is fitted loosely, i.e., in a non-contact manner, in the groove 8 formed within the lamination stack 10. Further, through the protrusion 9, there is disposed a terminal 19 to be connected with the stator coil 13.

Figure 5:
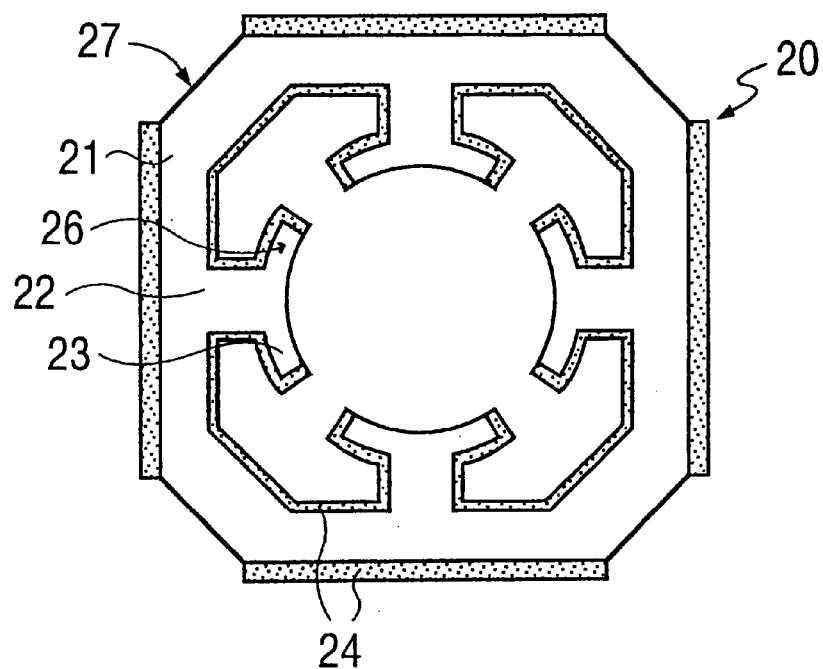
FIG. 5 is a transverse sectional view showing a lamination stack according to the second embodiment of a motor structure according to the invention.

FIG. 4 is a vertical sectional view showing a second embodiment of the invention and FIG. 5 is a transverse sectional view of the same. The lamination stack here is used for a pulse motor of an inner rotor type. Referring to FIG. 4 and FIG. 5, reference numeral 20 denotes a lamination stack constituting stator magnetic poles formed by laminating sheet members which are made of soft magnetic plates the same as before. The lamination stack 20 has a yoke portion 21 in an octagonal form, four stator magnetic pole portions 22 projecting inwardly from the yoke portion, and stator magnetic pole teeth 23 provided on the inward, front ends of the stator magnetic pole portions. The lamination stack 20 is formed, the same as in the case above, by laminating a plurality of sheet members and bonding the sheet members on top of each other with a bonding agent while having them insulated from each other. In this state there are formed no gaps between the sheet members.

Since the lamination stack 20 has been subjected to the bonding process within a metallic mold formed with sufficient precision, the constituents of the block of the lamination stack 20 are laminated and bonded with each other in satisfactory dimensional precision. However, since the laminated constituents of the lamination stack 20 are fixed on top of each other only by the bonding agent, they are weak against an external force. Therefore, in the present invention, a synthetic resin material is molded around the block formed by laminating sheet members and fixing them together with the bonding agent while insulating them from each other, so that the sheet members are held in tight contact with each other and prevented from getting out of shape of the lamination stack 20 over a long time of service.

To form such a lamination stack 20, first a metallic mold is prepared. On the interior of the metallic mold, there are previously provided protrusions for pressing the stator magnetic pole teeth 23 and the yoke portions 21 from the top and the bottom faces. After mounting the lamination stack in the metallic mold, a synthetic resin is poured into the metallic mold such that there is formed a synthetic resin layer on the inner periphery of the metallic mold. By the molding, a thin synthetic resin layer 24 is formed on the surfaces of the yoke portions 21, stator magnetic pole portions 22, and the stator magnetic pole teeth 23. Further, in the prepared metallic mold, there are provided holes for forming transition-wiring pins for keeping the transition wiring of the coil engaged therewith while the coils for the stator magnetic poles are wound around the stator magnetic pole portions 22 in the assembling process. Referring to FIG. 4, reference numeral 25 denotes the pin for the transition wiring that is formed.

In the second embodiment of the invention, in the course of the molding process, the synthetic resin layer is not formed at the portions 26 on the inner side of the stator magnetic teeth 23 confronting the rotor magnetic poles, or at the portions 27 on the outer side of the yoke portion 21, which are put into contact with the later described case.

Figure 6:
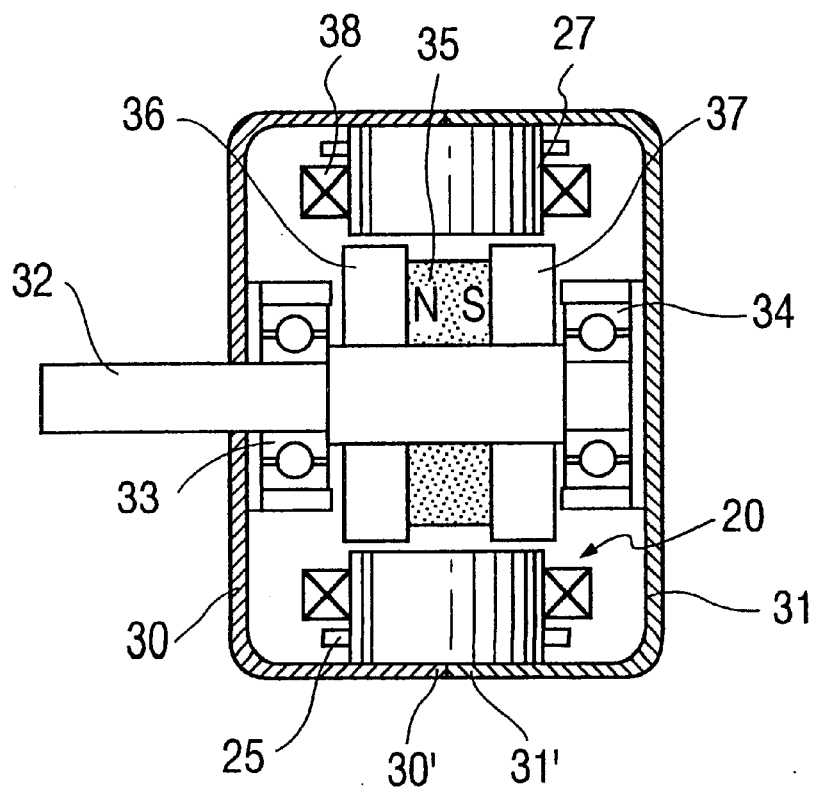
FIG. 6 is a sectional view of a structure of a motor of an inner-rotor type to which a lamination stack according to the invention is applied.

FIG. 6 shows a sectional view of a stepping motor of an inner rotor type in which a lamination stack according to the invention is used. Referring to FIG. 6, reference numeral 30 denotes an upper case and 31 denotes a lower case. Both the upper case 30 and the lower case 31 are formed by punching cup shapes from a non-magnetic metallic plate and both their circumferences 30' and 31' have octagonal forms of the same size as the contour of the lamination stack shown in FIG. 5. The upper case 30 has a through hole in the center of its bottom and a revolving shaft 32 is passed therethrough.

To the bottom portions of the upper case 30 and the lower case 31, there are fixed bearings 33 and 34 for rotatably supporting the revolving shaft 32. On the revolving shaft 32, there is fixed a permanent magnet 36, and on the top face and the bottom face of the permanent magnet 35, there are provided pole piece plates 36 and 37 serving as the rotor magnetic poles. Reference numeral 38 denotes a stator magnetic pole coil wound around the stator magnetic pole portion 22.

Having described the invention as related to the above two embodiments, it is apparent that variations are possible within the scope of the spirit of the present invention and these variations or applications are not to be excluded from the scope of the present invention.

As described above in detail, since the invention set forth in claim 1 includes a lamination stack maintaining a plurality of sheet members in such a state that they are laminated, while being insulated from each other, and kept in tight contact with each other and having a synthetic resin layer surrounding the sheet members, such a lamination stack can be obtained that produces small eddy current loss, has good tightness between the adjoining sheet members of the lamination, maintains the accuracy of the lamination stack over a long time of service, and is durable.

In the invention set forth in claim 2, since the plurality of sheet members is bonded on top of each other with a bonding agent, the effects as described above are further enhanced.

In the invention set forth in claim 3, the invention provides an excellent product when applied to a brushless motor of a flat type for use in an FDD drive device.

In the invention set forth in claim 4, the invention provides an excellent product when applied to a pulse motor.

In the invention set forth in claim 5, since the lamination stack is surrounded by a synthetic resin layer, it hardly occurs that the lamination stack gets out of shape and, therefore, the case can be provided by a simple punched-out structure from an economical sheet metal. Therefore, the whole of the motor becomes simple in structure and can be fabricated at low cost.

In the invention set forth in claim 6, since the leakage flax can be reduced in addition to the effects obtained from the invention set forth in claim 5, the performance of the motor can be improved.

What is claimed is:

1. A motor structure, comprising:
   a laminated stack formed of a plurality of laminated soft magnetic shin plates which serve as the stator magnetic poles and yoke, wherein the soft magnetic plates are glued and pressed together, but insulated from each other, via an insulative bonding material between adjacent plates, and a synthetic resin layer surrounds and bonds the laminated soft magnetic shin plates of said lamination stack tightly.

2. A motor structure according to claim 1, wherein said motor structure is an outer rotor type motor structure.

3. A motor structure according to claim 1, wherein said motor structure is an inner rotor type motor structure.

4. A motor structure according to claim 1, wherein said motor structure is enclosed by a case.

5. A motor structure according to claim 4, wherein said case is made of pressed soft magnetic metallic plate.

* * * * *

UNITED STATES PATENT AND TRADEMARK OFFICE
CERTIFICATE OF CORRECTION

PATENT NO.: 6,043,583
DATED     : March 28, 2000
INVENTOR(S): Souichi KUROSAWA, et al.

It is certified that [an/error[s]] appears in the above-identified patent and that said Letters Patent is hereby corrected as shown below:

Col. 3, line 12, change "are" to --is--.

Col. 5, line 23, change "36" to --35--.

Signed and Sealed this

First Day of May, 2001

NICHOLAS P. GODICI

*Attest:*

*Attesting Officer*   *Acting Director of the United States Patent and Trademark Office*